(12) United States Patent
Birkner et al.

(10) Patent No.: US 11,331,763 B2
(45) Date of Patent: May 17, 2022

(54) METHOD AND TOOL FOR ROUGHENING A CYLINDER BORE WALL TO BE COATED, AND COMPONENT FOR GUIDING A CYLINDER PISTON

(71) Applicants: MAG IAS GmbH, Eislingen (DE); Sturm Maschinen- & Anlagenbau GmbH, Salching (DE)

(72) Inventors: Tobias Birkner, Deizisau (DE); Oliver Kull, Neuhausen (DE); Marc Kesting, Straubing (DE)

(73) Assignees: MAG IAS GMBH, Eislingen (DE); STURM MASCHINEN- & ANLAGENBAU GMBH, Salching (DE)

( * ) Notice: Subject to any disclaimer, the term of this patent is extended or adjusted under 35 U.S.C. 154(b) by 893 days.

(21) Appl. No.: 16/061,525

(22) PCT Filed: Dec. 12, 2016

(86) PCT No.: PCT/EP2016/080540
§ 371 (c)(1),
(2) Date: Jun. 12, 2018

(87) PCT Pub. No.: WO2017/102608
PCT Pub. Date: Jun. 22, 2017

(65) Prior Publication Data
US 2020/0290172 A1  Sep. 17, 2020

(30) Foreign Application Priority Data

Dec. 18, 2015 (DE) ..................... 10 2015 226 062.3

(51) Int. Cl.
*B24B 33/02* (2006.01)
*B24B 39/02* (2006.01)
(Continued)

(52) U.S. Cl.
CPC ............. *B24B 33/02* (2013.01); *B21H 7/187* (2013.01); *B23B 27/24* (2013.01); *B23P 9/02* (2013.01);
(Continued)

(58) Field of Classification Search
CPC ......... B24B 33/02; B24B 39/02; B23P 13/02; B23P 9/025; B23P 9/02; B23B 27/24;
(Continued)

(56) References Cited

U.S. PATENT DOCUMENTS 3,133,344 A    5/1964  Keasler
5,622,753 A *  4/1997  Shepley .................... C23C 4/02
                                                    427/233
(Continued)

FOREIGN PATENT DOCUMENTS

CN         1878972 A    12/2006
CN       101928908 A    12/2010
(Continued)

*Primary Examiner* — Ryan J. Walters
(74) *Attorney, Agent, or Firm* — McGlew and Tuttle, P.C.

(57) ABSTRACT

A method for roughening a cylinder bore wall to be coated of a component, at least one groove, running around the central longitudinal axis, and at least one associated groove web, are generated such that the at least one groove web, in a radial direction directed toward the central longitudinal axis, forms first undercuts for a coating which is to be applied. Axial grooves running in the cylinder bore wall transversely to the at least one groove are generated such that the at least one groove web, in a peripheral direction about the central longitudinal axis, forms respective second undercuts for the coating which is to be applied. An adhesion of the coating which is to be applied, in the peripheral direction, is improved, so that stress cracks or detachments owing to a different thermal expansion of the component and of the coating which is to be applied are avoided.

16 Claims, 7 Drawing Sheets

(51) Int. Cl.
  *C23C 4/02* (2006.01)
  *B23P 9/02* (2006.01)
  *B23B 27/24* (2006.01)
  *B21H 7/18* (2006.01)
  *B23P 13/02* (2006.01)
  *F02F 1/18* (2006.01)

(52) U.S. Cl.
  CPC .............. *B23P 9/025* (2013.01); *B23P 13/02* (2013.01); *B24B 39/02* (2013.01); *C23C 4/02* (2013.01); *B21H 7/18* (2013.01); *F02F 1/18* (2013.01)

(58) Field of Classification Search
  CPC ... B21H 7/187; B21H 7/18; C23C 4/02; F02F 1/18
  See application file for complete search history.

(56) References Cited

U.S. PATENT DOCUMENTS

| | | | |
|---|---|---|---|
| 7,614,272 B2 * | 11/2009 | Sekikawa | B23P 9/02 118/44 |
| 9,162,418 B2 * | 10/2015 | Whitbeck | F02F 1/18 |
| 10,526,996 B2 * | 1/2020 | Yang | B24B 5/06 |
| 2008/0260958 A1 * | 10/2008 | Sekikawa | C23C 28/021 427/448 |
| 2010/0326270 A1 | 12/2010 | Doerfler et al. | |
| 2014/0010977 A1 * | 1/2014 | Whitbeck | C23C 4/02 428/34.1 |
| 2017/0291234 A1 | 10/2017 | Kopton | |

FOREIGN PATENT DOCUMENTS

| | | |
|---|---|---|
| CN | 103132000 A | 6/2013 |
| DE | 103 14 249 B3 | 10/2004 |
| DE | 10 2012 211 074 A1 | 1/2014 |
| DE | 10 2014 006 845 A1 | 11/2015 |
| DE | 10 2014 209 054 A1 | 11/2015 |
| EP | 2 267 178 A2 | 12/2010 |
| GB | 842 386 A | 7/1960 |
| JP | 2006 097045 A | 4/2006 |
| JP | 2006 181608 A | 7/2006 |
| JP | 2006181608 A | 7/2006 |

* cited by examiner

METHOD AND TOOL FOR ROUGHENING A CYLINDER BORE WALL TO BE COATED, AND COMPONENT FOR GUIDING A CYLINDER PISTON

CROSS REFERENCE TO RELATED APPLICATIONS

This application is a United States National Phase Application of International Application PCT/EP2016/080540 filed Dec. 12, 2016 and claims the benefit of priority under 35 U.S.C. § 119 of German Patent Application Serial No. DE 10 2015 226 062.3 filed Dec. 18, 2015, the entire contents of which are incorporated herein by reference.

FIELD OF THE INVENTION

The invention relates to a method and a tool for roughening a cylinder bore wall to be coated. The invention further relates to a component for guiding a cylinder piston.

BACKGROUND OF THE INVENTION

From EP 2 267 178 A2 (corresponding to US 2010/0326270 A1), a method for roughening a metal surface to be coated of a cylinder block is known. The metal surface bounds a cylinder bore. By means of a turning tool, a helical groove running in the peripheral direction is generated in the metal surface. Due to the helical configuration, the groove is laterally bounded by a groove web. The groove web is plastically deformed, so that it forms, in a radial direction directed toward a central longitudinal axis of the cylinder bore, undercuts. In cross section, the groove thus tapers in the radial direction due to the undercuts. As a result, a coating subsequently applied to the roughened metal surface exhibits an improved adhesion.

From DE 10 2014 209 054 A1, a method for mechanically roughening a piston running surface of a cylinder liner is known. In a first operation, a groove-forming tool is moved axially along the surface, so that axial grooves can be made in the surface. In a subsequent second operation, the groove-forming tool, in the axial position reached in the first operation, is rotated through a predefined rotation angle about the cylinder axis, whereby peripheral grooves are made in the surface, which peripheral grooves intersect the axial grooves. The axial grooves and the peripheral grooves are undercut in the shape of a dovetail.

SUMMARY OF THE INVENTION

The object of the invention is to provide a method for roughening a cylinder bore wall to be coated, which method enables in a simple manner an improved adhesion of a coating which is to be applied to the cylinder bore wall.

This object is achieved by a method for roughening a cylinder bore wall to be coated, comprising the following steps: provision of a component having a cylinder bore and a cylinder bore wall running around a central longitudinal axis, generation of at least one groove, running around the central longitudinal axis in the cylinder bore wall, and at least one associated groove web, such that the at least one groove web, in a radial direction, directed toward the central longitudinal axis, forms first undercuts for a coating which is to be applied, and generation of axial grooves, running transversely to the at least one groove in the cylinder bore wall, such that the at least one groove web, in a peripheral direction about the central longitudinal axis, forms respective second undercuts for the coating which is to be applied, and the at least one groove web beside at least one of the axial grooves, forms at least one material projection, which extends into the at least one groove and, in the peripheral direction, forms a respective further undercut for the coating which is to be applied. In the cylinder bore wall, at least one circumferential groove and at least one associated groove web are generated. The at least one groove is laterally bounded by the at least one groove web. The at least one groove and the at least one associated groove web are, in particular, of helical configuration. The generation of the at least one groove preferably comprises a machining by means of a metal-cutting machining tool and/or a plastically deforming machining by means of a shaping machining tool. The machining tool is rotated relative to the component about the central longitudinal axis and, in addition, is linearly displaced, in particular, along the central longitudinal axis. The at least one groove web is configured profiled in such a way that it forms, in a radial direction directed toward the central longitudinal axis, first undercuts for the coating which is to be applied. In the generation of the at least one groove, the groove web is configured such that it is profiled and/or profiled by a plastic deformation. For instance, the at least one groove is generated by a metal-cutting machining tool having a profiled cutting edge, so that the at least one groove, starting from a groove bottom, tapers in the radial direction, and the at least one associated groove web is profiled for the formation of the first undercut. Furthermore, the at least one groove is generated, for instance, by means of a metal-cutting machining tool of rectangular cross section, and the at least one associated groove web is subsequently plastically deformed such that it forms in the radial direction the first undercuts. As a result of the at least one groove and the at least one associated groove web, the coating which is to be applied has good adhesion in the radial direction and in an axial direction parallel to the central longitudinal axis.

Through the generation of axial grooves running transversely to the at least one groove in the cylinder bore wall, the at least one groove web additionally forms, in a peripheral direction about the central longitudinal axis, respective second undercuts for the coating which is to be applied. The transversely running axial grooves run, in particular, perpendicularly or at an angle, deviating from 90°, to the at least one groove, so that the axial grooves intersect the at least one groove. The axial grooves interrupt the at least one groove web at least partially, wherein, in the region of the interruption, the respective second undercuts are formed. As a result of the axial grooves, there are thus generated in the peripheral direction undercuts or interruptions, which improve the adhesion of the coating in the peripheral direction. This is in particular advantageous if the component is made of a light metal, for instance of aluminum, and the component and the coating material which is to be applied have markedly different coefficients of thermal expansion. This is the case, for instance, if the component is made of a light metal and the coating material contains iron. Because the component heats up strongly in the course of the thermal coating, mechanical stresses are generated during the coating and the following cooling. As a result of the second undercuts and the improved adhesion of the coating to the cylinder bore wall in the peripheral direction, these stresses do not lead to stress cracks, running parallel to the central longitudinal axis, in the coating, or detachments of the coating from the component. The component is, in particular, a cylinder crankcase or a cylinder liner. Both cylinder liners and cylinder crankcases heat up strongly in the course of the thermal coating owing to the low mass. The strong heating relates, in particular, also to cylinder crankcases, since these, as a result of the so-called downsizing and as a result of the sought-after weight reduction, have a comparatively low mass.

Because the at least one groove web beside at least one of the axial grooves, preferably beside a plurality of axial grooves, forms at least one material projection, for the coating which is to be applied an enlarged adhesion area is provided. In particular, the at least one groove web beside all axial grooves forms a respective material projection. If the axial grooves are generated by a plastic deformation of the at least one groove web, then the associated material projections are formed by material displacement together with the axial grooves. The respective material projection forms for the coating which is to be applied further undercuts, so that the adhesion is additionally improved.

Firstly, the at least one groove running in the cylinder bore wall is generated, so that subsequently the axial grooves have to be generated only in the at least one groove web. The axial grooves are generated, for instance, by plastic deformation, by machining, such as, for instance, milling, slotting, broaching or honing, and/or by energy irradiation, for instance by laser irradiation. The axial grooves are preferably generated such that these are distributed over the whole of the periphery of the cylinder bore wall.

After the generation of the undercuts, the cylinder bore wall is thermally coated. In the thermal coating is applied a coating material, which, after the cooling, forms the coating. As a result of the undercuts, the coating exhibits an improved adhesion in three directions, namely in the radial direction directed toward the central longitudinal axis, in the axial direction parallel to the central longitudinal axis, and in the peripheral direction about the central longitudinal axis. During and after the coating, in particular in motor-powered operation, stress cracks in the coating and flaking of the coating are hereby avoided. Moreover, the adhesion of the coating, in the region of the at least one incoming and outgoing groove, to the top chamfer and/or bottom chamfer of the cylinder bore wall is improved.

A method according to which the at least one groove has a groove depth $T_N$ and the axial grooves have a groove depth $T_A$, wherein: $0.05 \leq T_A/T_N \leq 2$, in particular $0.1 \leq T_A/T_N \leq 1$, and in particular $0.2 \leq T_A/T_N \leq 0.9$, ensures in a simple manner an improved adhesion of the coating which is to be applied. The groove depth $T_N$ is defined starting from a groove bottom of the at least one groove up to the cylinder bore wall. Correspondingly, the groove depth $T_A$ is defined from a groove bottom of the respective axial groove up to the cylinder bore wall. As a result of the ratio $T_A/T_N$, on the one hand a sufficiently high adhesion of the coating in the peripheral direction, and on the other hand a simple generation of the axial grooves, is ensured.

A method according to which the at least one groove web has a groove web width and the axial grooves extend over the whole of the groove web width ensures in a simple manner an improved adhesion. Because the axial grooves extend respectively over the whole of the groove web width, the second undercuts have a largest possible extent and thus provide to the coating which is to be applied a large adhesion area. Moreover, the generation of the axial grooves is easily possible.

A method according to which the at least one groove has a groove width $B_N$ and the axial grooves have a groove width $B_A$, wherein: $0.05 \leq B_A/B_N \leq 2$, in particular $0.2 \leq B_A/B_N \leq 1.5$, and in particular $0.4 \leq B_A/B_N \leq 1$, ensures in a simple manner an improved adhesion. The at least one groove defines a maximum groove width $B_N$. Correspondingly, the axial grooves define a maximum groove width $B_A$. By the ratio $B_A/B_N$, it is on the one hand ensured that the coating which is to be applied, in the region of the axial grooves, has sufficient material thickness, and thus sufficient strength, so that an improved adhesion in the peripheral direction is obtainable. On the other hand, by the ratio $B_A/B_N$, a simple generation of the axial grooves is ensured.

A method according to which the axial grooves form with the central longitudinal axis an angle $\alpha$, wherein: $-60° \leq \alpha \leq 60°$, in particular $-20° \leq \alpha \leq 20°$, and in particular $-10° \leq \alpha \leq 10°$, ensures in a simple manner an improved adhesion. By a small angle ≤, it is on the one hand ensured that the axial grooves run substantially perpendicular to the peripheral direction. On the other hand, the angle a ensures a quick and simple generation of the axial grooves, for instance by an axial movement and a, where necessary, superimposed rotational movement of a tool relative to the component.

A method according to which the generation of the at least one groove comprises a machining, and/or the at least one groove has a spiral angle ß, wherein: $0° < ß \leq 4°$, in particular $0.1° \leq ß \leq 3°$, and in particular $0.2° \leq ß \leq 2°$, ensures a simple generation of the at least one groove and of the at least one associated groove web. The at least one groove is generated by a combined linear and rotational movement of a metal-cutting machining tool. The formation of the first undercut is realized by a profiled cutting edge of the metal-cutting machining tool and/or by a plastic deformation by means of a shaping machining tool.

A method according to which in the peripheral direction, adjacent axial grooves have an angular spacing $\Delta\varphi$, wherein: $0.5° \leq \Delta\varphi 24°$, in particular $0.5° \leq \Delta\varphi 15°$, and in particular $0.5° \leq \Delta\varphi \leq 2°$, ensures in a simple manner an improved adhesion. The angular spacing corresponds to the number of axial grooves. The smaller is the angular spacing, the larger is the number of axial grooves. The angular spacing is chosen such that, on the one hand, sufficiently many axial grooves are distributed over the whole of the periphery of the cylinder bore wall. On the other hand, the angular spacing is chosen such that the at least one groove web between two adjacent axial grooves has sufficient material thickness, and thus sufficient strength. As a result of the angular spacing, an improved adhesion for the coating which is to be applied is ensured in the peripheral direction.

A method according to which the axial grooves have a tapered cross section, which, in particular, is of wedge-shaped configuration, ensures in a simple manner an improved adhesion. The axial grooves have a cross section which tapers, starting from the at least one groove web, in the direction of the groove bottom of the respective axial groove. It is hereby ensured that the coating material to be applied can penetrate into the respective axial groove as far as the groove bottom. Furthermore, axial grooves of tapered cross section can be easily generated, for instance by a plastic deformation of the at least one groove web.

A method according to which the at least one groove web has a plurality of groove web windings extending in the peripheral direction over 360°, and the axial grooves configured in the groove web windings are oriented along straight lines ensures in a simple manner an improved adhesion. The at least one groove web is of helical or circumferential configuration and has a plurality of groove web windings extending in the peripheral direction over 360°. The axial grooves oriented in the groove web windings along a straight line are generated in a simple manner by a linear movement of a tool along the central longitudinal axis.

A method according to which for the generation of the axial grooves, a tool having at least one deformation roller is moved along the central longitudinal axis, and the at least one deformation roller rotates about a rotational axis, running transversely to the central longitudinal axis, in such a way on the cylinder bore wall that the at least one deformation roller plastically deforms the cylinder bore wall, in particular the at least one groove web, for the formation of the axial grooves, ensures in a simple manner the generation of the axial grooves. The axial grooves are generated by a plastic deformation of the at least one groove web, in that a tool having at least one deformation roller is moved relative to the component along the central longitudinal axis. The at least one deformation roller bears against the cylinder bore wall and rotates, due to the linear movement of the tool, about the rotational axis running transversely, in particular perpendicular, to the central longitudinal axis, so that, due to a contact pressure, a plastic deformation of the cylinder bore wall, in particular of the at least one groove web, is realized.

A method according to which the at least one deformation roller is rotatably mounted on a tool main body and is radially displaceable relative to the tool main body ensures in a simple manner an improved adhesion. As a result of the at least one deformation roller, which is displaceable radially to the tool main body, the contact pressure of the at least one deformation roller, with which this bears against the cylinder bore wall, is adjusted in a simple manner. As a result, the axial grooves can be generated with an adjustable groove depth.

A method according to which the generation of the axial grooves comprises the following steps: movement of a tool, having at least one deformation roller, along the central longitudinal axis, such that the at least one deformation roller plastically deforms the cylinder bore wall, in particular the at least one groove web, for the formation of a first part of the axial grooves, pivoting of the tool, if the at least one deformation roller is disengaged from the cylinder bore wall, and movement of the tool along the central longitudinal axis such that the at least one deformation roller plastically deforms the cylinder bore wall, in particular the at least one groove web, for the formation of a second part of the axial grooves ensures a quick and simple generation of the axial grooves for improvement of the adhesion. As a result of a first linear movement of the tool relative to the component, firstly a first part of the axial grooves is generated by plastic deformation of the cylinder bore wall, in particular of the at least one groove web. If the at least one deformation roller is disengaged from the cylinder bore wall, the tool is pivoted through a pivot angle. After this, by a second linear movement, a second part of the axial grooves is generated. The pivoting and subsequent generation of the axial grooves is repeated, in particular until the axial grooves have been generated along the whole of the periphery of the cylinder bore wall. The linear movements can by superimposed by a rotational movement, so that the axial grooves form with the central longitudinal axis an angle $\alpha$. Successive linear movements have, in particular, an opposite direction.

A further object of the invention is to provide a component for guiding a cylinder piston, which component enables in a simple manner an improved adhesion of a coating which is to be applied to the cylinder bore wall.

This object is achieved by a component for guiding a cylinder piston, in particular of an internal combustion engine, having a main body, at least one cylinder bore configured in the main body, a cylinder bore wall, running around a central longitudinal axis of the at least one cylinder bore, and at least one groove, running around the central longitudinal axis in the cylinder bore wall, and at least one associated groove web, which, in a radial direction directed toward the central longitudinal axis, forms first undercuts for a coating which is to be applied, wherein in the at least one groove web are configured a plurality of axial grooves, which run transversely to the at least one groove, and the at least one groove web, in a peripheral direction about the central longitudinal axis, due to the axial grooves, forms respective second undercuts for the coating which is to be applied, wherein the at least one groove web beside at least one of the axial grooves forms at least one material projection, which extends into the at least one groove and in the peripheral direction forms a respective further undercut for the coating which is to be applied. The advantages of the component according to the invention correspond to the already described advantages of the method according to the invention. The component according to the invention can be refined, in particular, also with the features of the method according to the invention. The component is, for instance, a cylinder crankcase or a cylinder liner.

A further object of the invention is to provide a tool for roughening a cylinder bore wall to be coated, which tool enables in a simple manner an improved adhesion of a coating which is to be applied to the cylinder bore wall.

This object is achieved by a tool for roughening a cylinder bore wall to be coated, having a tool main body for clamping in a tool spindle, at least one deformation roller rotatably mounted on the tool main body, wherein the at least one deformation roller is arranged peripherally on the tool main body, a rotational axis of the at least one deformation roller runs perpendicular to a main body central longitudinal axis, and the at least one deformation roller, in particular, is displaceable radially to the main body central longitudinal axis. By means of the tool according to the invention, axial grooves can be generated in a simple manner in the cylinder bore wall. The generated axial grooves enable an improved adhesion of the coating which is to be applied to the cylinder bore wall, in the peripheral direction, about a central longitudinal axis of the cylinder bore. The tool is preferably inserted into the cylinder bore in such a way that the central longitudinal axis of the main body runs parallel, in particular concentrically, to the central longitudinal axis of the cylinder bore. In the inserted state, the at least one deformation roller bears against the cylinder bore wall. As a result of a linear movement of the tool in the direction of the central longitudinal axis, by means of the at least one deformation roller the axial grooves are generated by plastic deformation of the cylinder bore wall. The at least one deformation roller herein bears with a contact pressure against the cylinder bore wall and, owing to the linear movement, rotates about an associated rotational axis running transversely to the central longitudinal axis of the main body. Because the at least one deformation roller is preferably displaceable radially to the central longitudinal axis of the main body, the contact pressure is adjustable, so that the groove depth of the respective axial groove is adjustable. Preferably, the tool has a plurality of deformation rollers, which are arranged distributed over the periphery of the tool main body, rotatably thereon. The tool according to the invention enables a simple generation of the axial grooves in the cylinder bore wall by plastic deformation.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
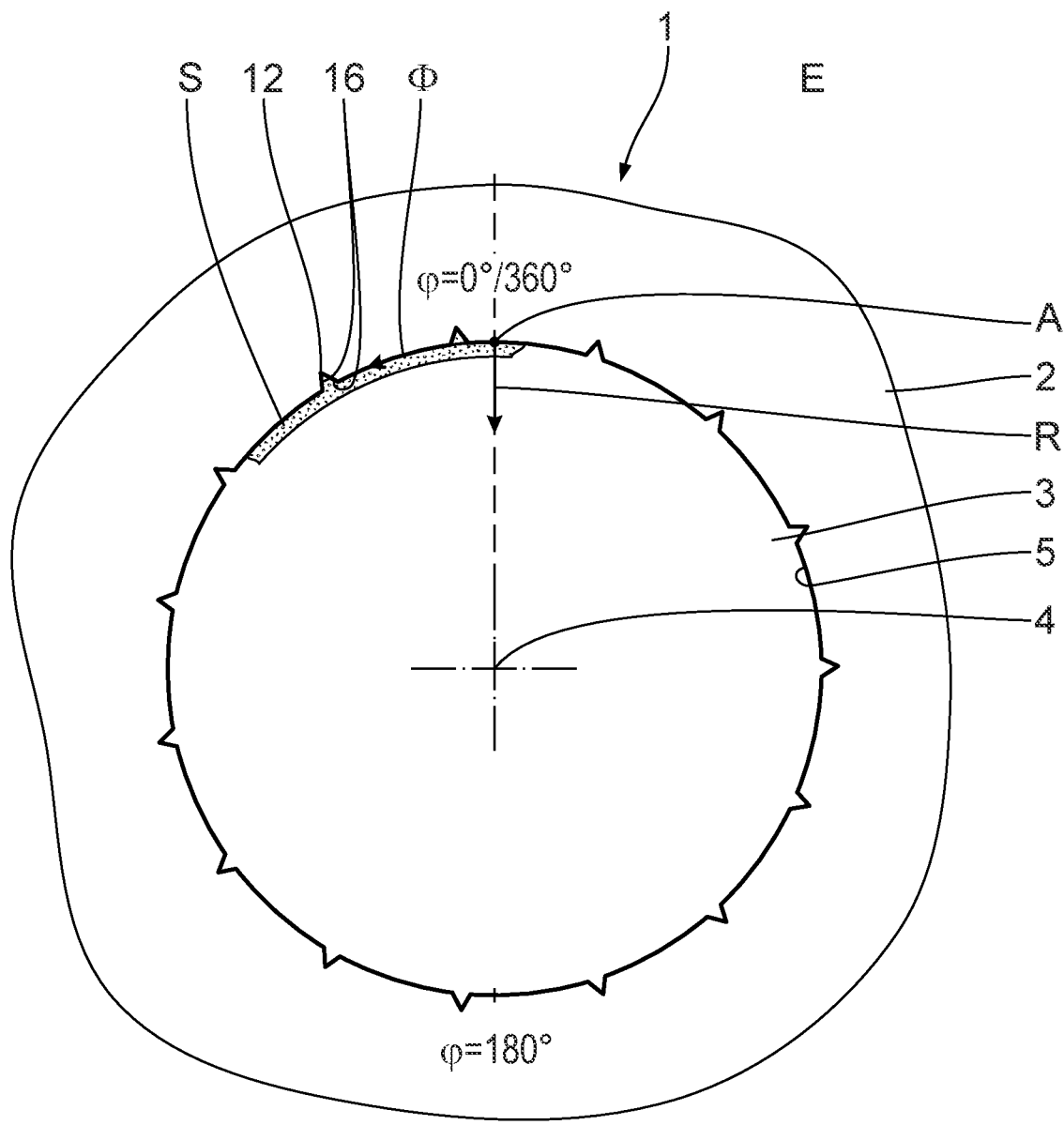
FIG. 1 is a segmental top view of a component or guiding a cylinder piston having a cylinder bore wall bounding a cylinder bore, according to a first illustrative embodiment.
Figure 2:
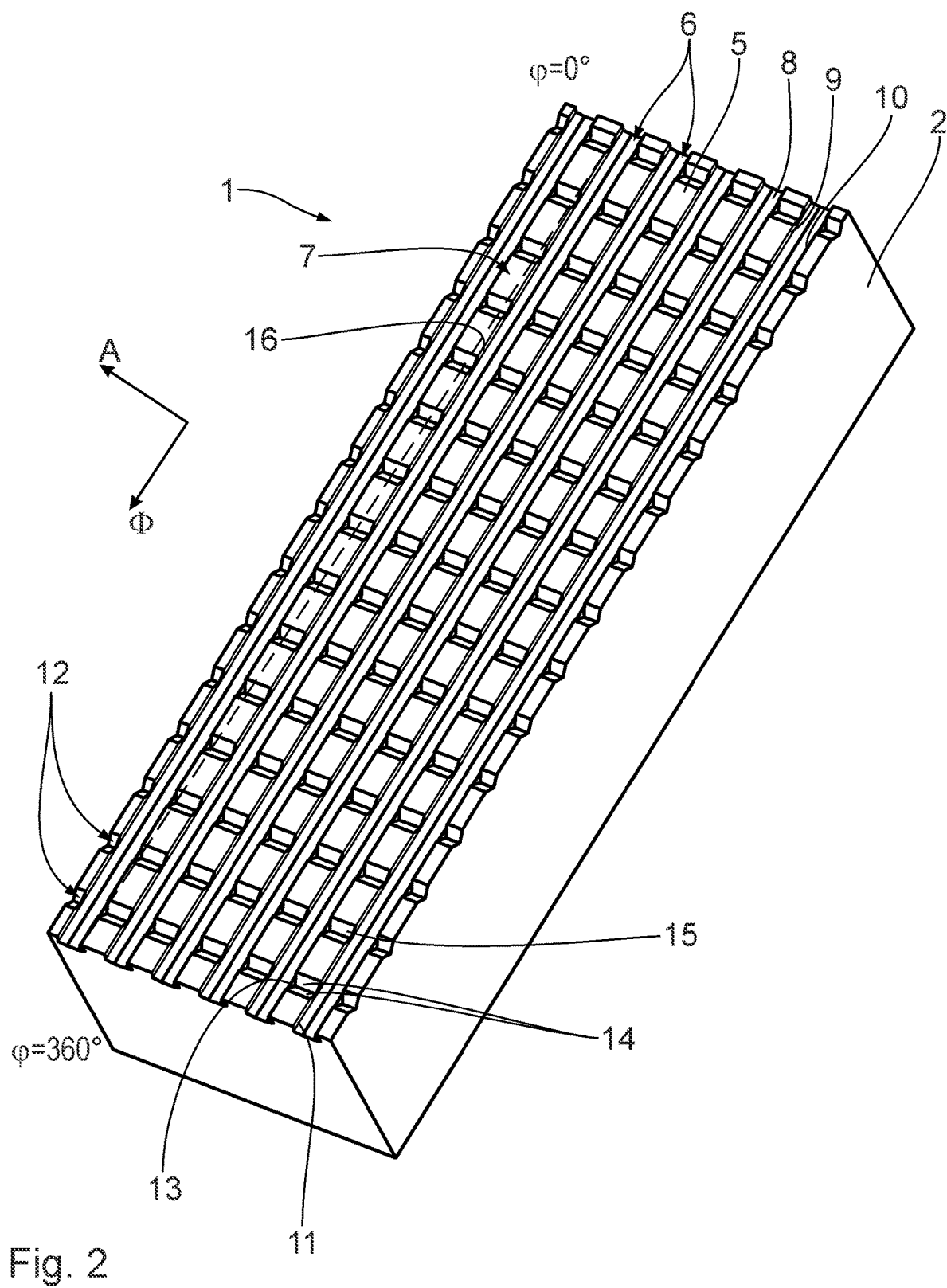
FIG. 2 is a perspective view of the cylinder bore wall having a helical groove and an associated groove web, and having axial grooves running transversely thereto, wherein the cylinder bore wall is represented in one plane for better illustration.
Figure 3:
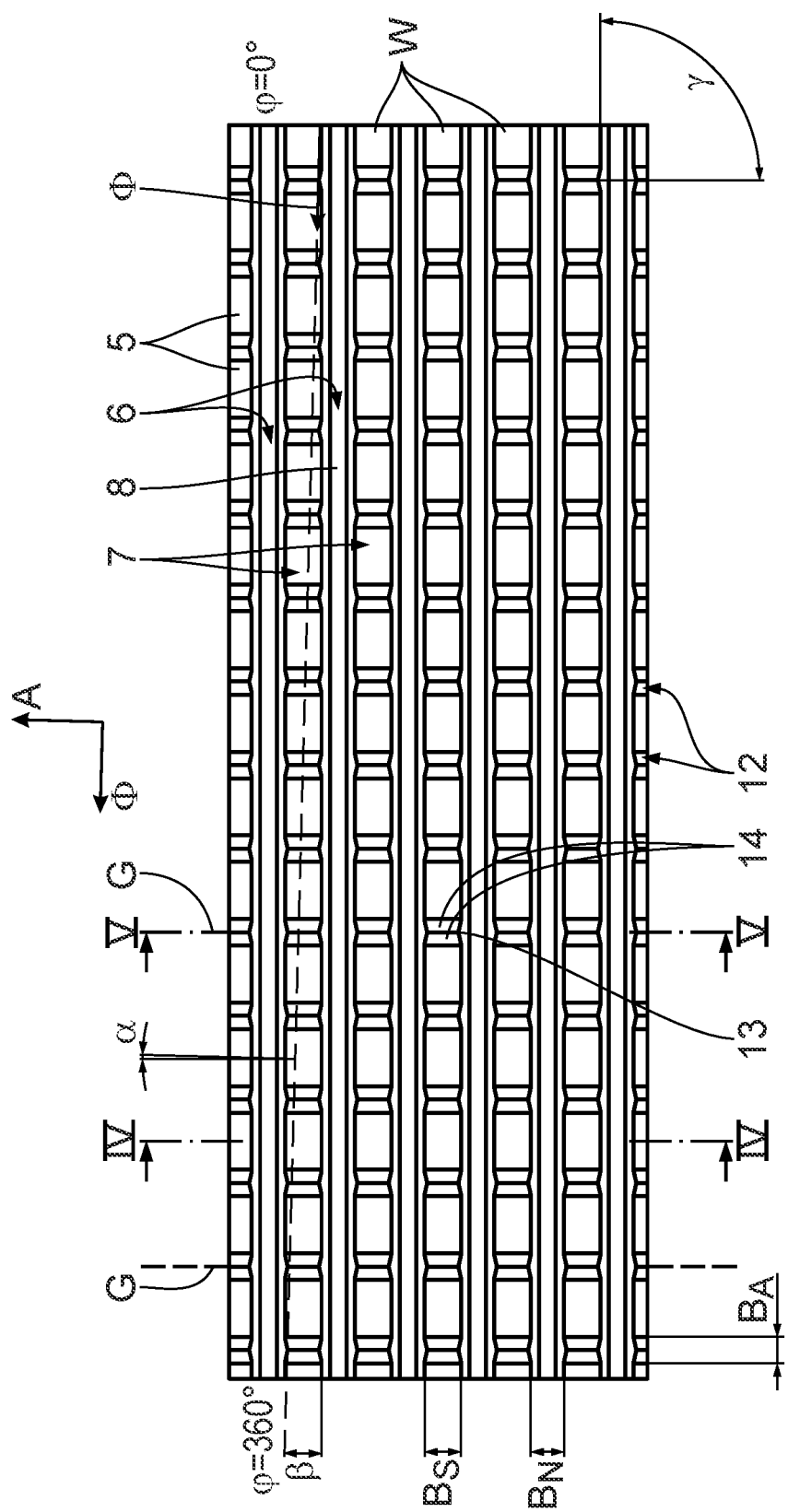
FIG. 3 is a top view of the cylinder bore wall according to FIG. 2.

Below, a first illustrative embodiment of the invention is described with reference to FIGS. 1 to 5. A component 1 for guiding a cylinder piston has a main body 2, in which at least one cylinder bore 3 is configured. The cylinder bore 3 has a central longitudinal axis 4. The cylinder bore 3 is bounded by a cylinder bore wall 5, which runs around the central longitudinal axis 4. The component 1 is, for instance, a cylinder crankcase or a cylinder liner of an internal combustion engine. The component 1 or the main body 2 is preferably formed of a light metal, in particular of aluminum.

In the cylinder bore wall 5 is configured a groove 6, which runs helically around the central longitudinal axis 4 and which is bounded by an associated helically running groove web 7. The cylinder bore wall 5 defines a peripheral direction $\Phi$, which runs in a plane E running, in turn, perpendicular to the central longitudinal axis 4. A position in the peripheral direction $\Phi$ is characterized by the angle $\phi$. The groove 6 forms with the peripheral direction $\Phi$ a spiral angle ß, wherein, for the spiral angle ß: $0° < ß \le 4°$, in particular $0.1° \le ß \le 3°$, and in particular $0.2° \le ß \le 2°$.

Figure 4:
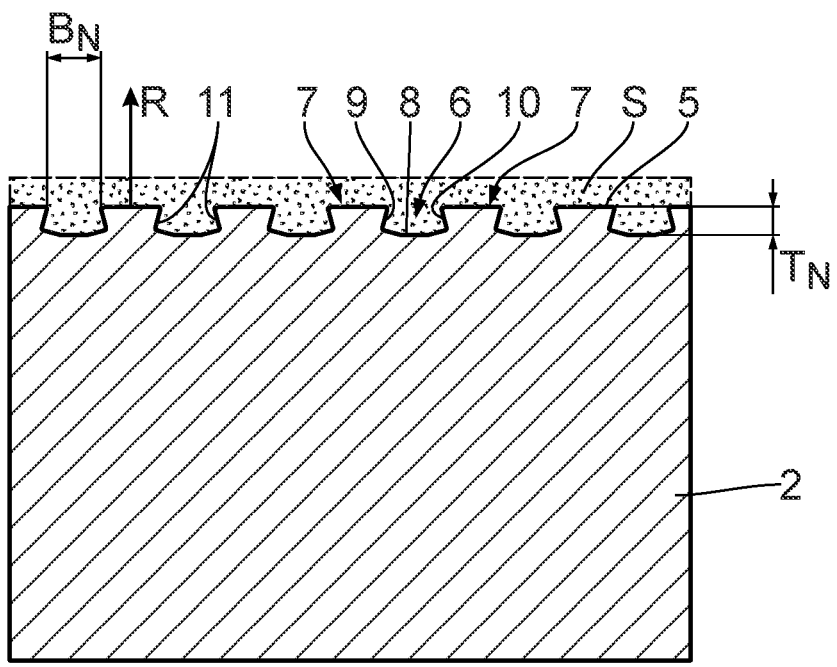
FIG. 4 is a sectional view through the cylinder bore wall along the sectional line IV-IV in FIG. 3.
Figure 5:
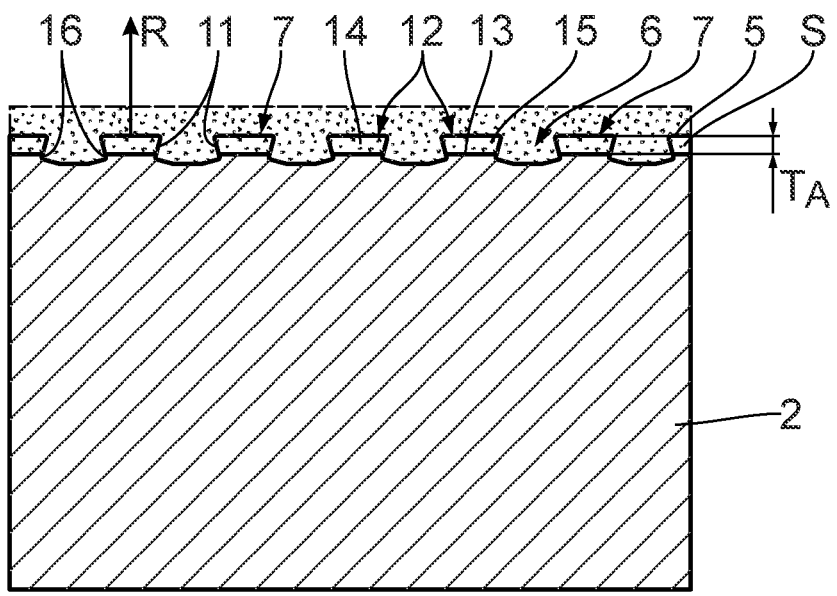
FIG. 5 is a sectional view through the cylinder bore wall along the sectional line V-V in FIG. 3.

The groove 6 has a groove bottom 8, and groove flanks 9, 10 arranged to the side thereof. The groove bottom 8 defines a groove depth $T_N$ relative to the cylinder bore wall 5. The groove flanks 9, 10 define between them a groove width $B_N$. The groove width $B_N$ increases in the direction of the groove bottom 8, so that the groove flanks 9, 10 form, in a radial direction R directed toward the central longitudinal axis 4, first undercuts 11 for a coating S which is to be applied. This is illustrated in FIG. 4. The groove flanks 9, 10 form, at the same time, the groove web side walls. The coating S which is to be applied is indicated in FIGS. 1, 4 and 5.

In the cylinder bore wall 5 are further configured axial grooves 12. The axial grooves 12 run transversely to the groove 6 and are thus configured in the groove web 7. The axial grooves 12 run, in particular, parallel to one another and/or perpendicular to the groove 6. The axial grooves 12 form with the central longitudinal axis 4 an angle $\alpha$, wherein: $-60° \le \alpha \le 60°$, in particular $-20° \le \alpha \le 20°$, and in particular $-10° \le \alpha \le 10°$. The axial grooves 12 form with the at least one groove 6 an angle $\gamma$, wherein preferably: $30° \le \gamma \le 150°$, in particular $70° \le \gamma \le 110°$, and in particular $80° \le \gamma \le 100°$.

The axial grooves 12 have a cross section which tapers in the direction of a respective groove bottom 13 and is of wedge-shaped configuration. The axial grooves 12 have, starting from the respective groove bottom 13 up to the cylinder bore wall 5, a groove depth $T_A$. For the ratio of the groove depths $T_A/T_N$: $0.05 \le T_A/T_N \le 2$, in particular $0.1 \le T_A/T_N \le 1$, and in particular $0.2 \le T_A/T_N \le 0.9$. In addition, the axial grooves 12 have respective groove flanks 14. Between the respective groove flanks 14, the axial grooves 12 have a respective groove width $B_A$. For the ratio of the maximum groove widths $B_A/B_N$: $0.05 \le B_A/B_N \le 2$, in particular $0.2 \le B_A/B_N \le 1.5$, and in particular $0.4 \le B_A/B_N \le 1$.

The groove web 7 has in the peripheral direction $\Phi$ a plurality of groove web windings W extending respectively over 360°. The axial grooves 12 are configured along straight lines G in the groove web windings W. The groove web 7 has a groove web width $B_S$. The axial grooves 12 thus extend over the whole of the groove web width $B_S$. The axial grooves 12 are arranged at a distance apart in the peripheral direction $\Phi$. The axial grooves 12 are distributed in particular in the peripheral direction $\Phi$ over the whole of the periphery of the cylinder bore wall 5. The axial grooves 12 have an angular spacing $\Delta\phi$, wherein: $0.5° \le \Delta\phi \le 24°$, in particular $0.5° \le \Delta\phi 15°$, and in particular $0.5° \le \Delta\phi \le 2°$. Preferably, the axial grooves 12 run along the straight line G and/or, in the peripheral direction $\Phi$, adjacent axial grooves 12 run parallel to one another.

The groove flanks 14 of the respective axial groove 12 form for the coating S which is to be applied, in the peripheral direction $\Phi$, respective second undercuts 15. The groove flanks 14 form, at the same time, groove web walls, which, for a coating S which is to be applied, enable adhesion in the peripheral direction $\Phi$. This is illustrated in FIG. 5.

In an axial direction A which runs parallel to the central longitudinal axis 4, the groove 6 additionally forms third undercuts. The third undercuts 16 are formed, in particular, by the groove flanks 9, 10, which at the same time are groove web side walls. This is illustrated in FIG. 5.

Figure 6:
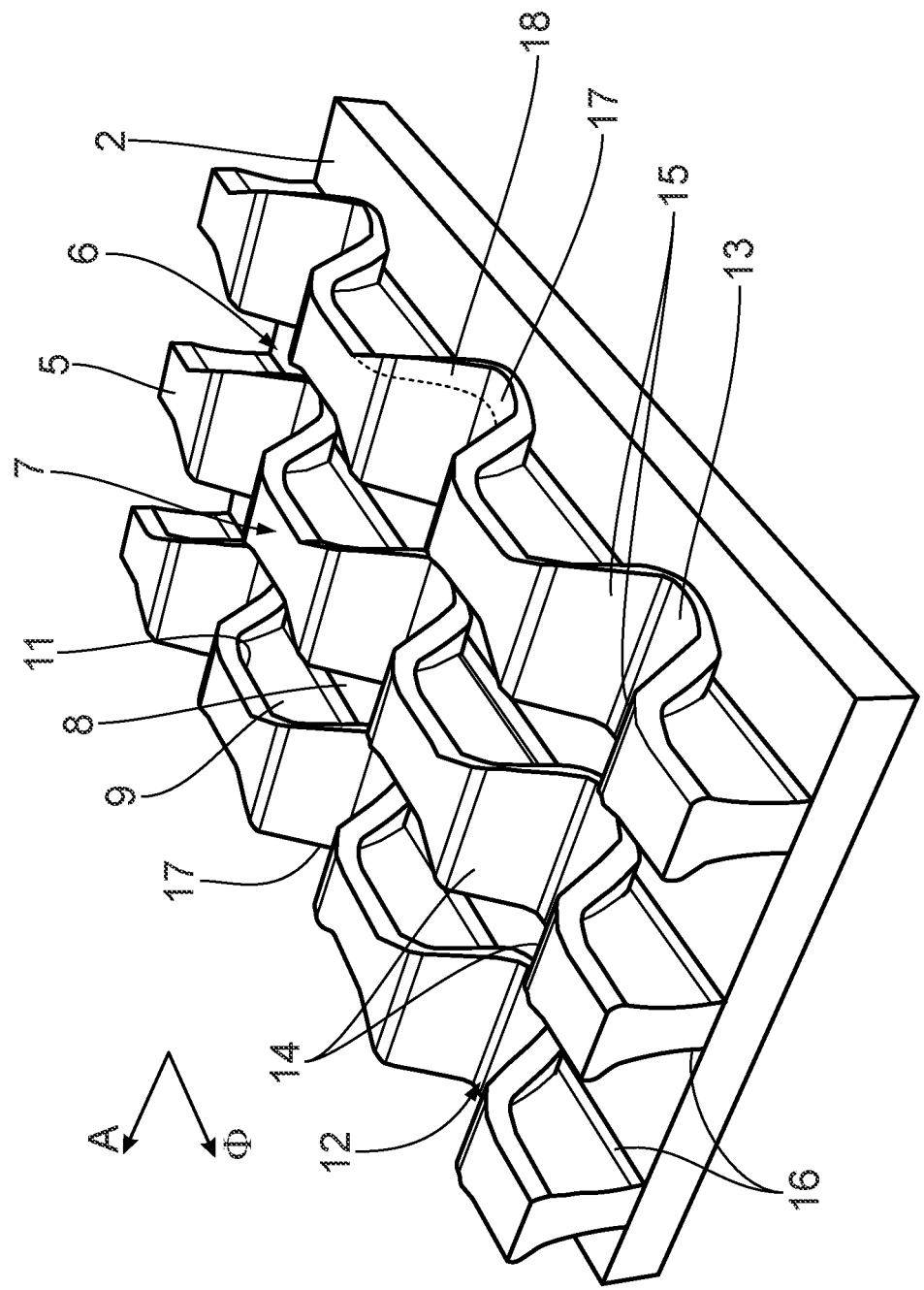
FIG. 6 is a perspective view of a cylinder bore wall according to a second illustrative embodiment, wherein the cylinder bore wall is represented, in accordance with FIG. 2, in one plane.
Figure 7:
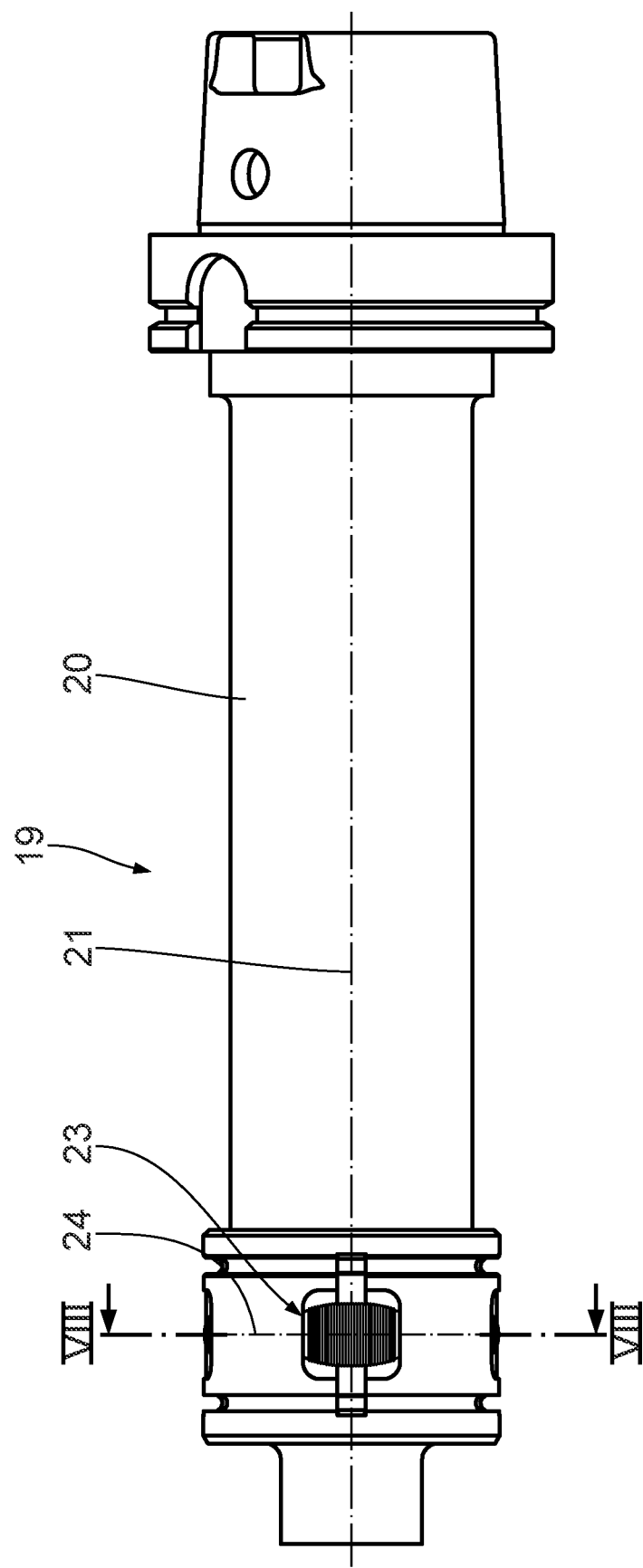
FIG. 7 is a side view of a tool for roughening the cylinder bore wall and for generating the axial grooves.

Below, a second illustrative embodiment of the invention is described with reference to FIG. 6. Unlike the component 1 according to the first illustrative embodiment, the groove web 7 beside the axial grooves 12 forms respective material projections 17, which extend into the groove 6. The material projections 17 form in the peripheral direction $\Phi$ respective fourth undercuts 18 for the coating S which is to be applied. With respect to the further structure and the further working method of the component 1 according to the invention, reference is made to the preceding illustrative embodiment.

Below, a method for roughening the cylinder bore wall 5 to be coated is described:

In the cylinder bore wall 5, the helically running groove 6 and the associated groove web 7 are generated. To this end, a machining tool is inserted into the cylinder bore 3, which tool rotates relative to the component 1 about the central longitudinal axis 4 and, at the same time, is moved linearly along the central longitudinal axis 4. The machining tool is configured as a metal-cutting machining tool and/or shaping machining tool. The groove 6 is accordingly generated by a machining and/or a plastic deformation of the cylinder bore wall 5. The groove 6 is generated, for instance, solely by machining by means of a metal-cutting machining tool having a profiled cutting edge. The first undercuts 11 are generated, in particular, by the profiled cutting edge of the metal-cutting machining tool and/or by the shaping machining tool. The spiral angle ß is set by the ratio of the rotation speed to the linear speed of the machining tool.

Furthermore, the axial grooves 12 are generated. To this end, a tool 19, which is hereinafter also referred to as a roughening tool, is inserted into the cylinder bore 3 and, for the generation of the axial grooves 12, moved relative to the component 1 along the central longitudinal axis 4. In addition, the roughening tool 19 can be rotated about the central longitudinal axis 4, so that the axial grooves 12 form with the central longitudinal axis 4 the angle α.

The generation of the axial grooves 12 can be realized before or after the generation of the groove 6. Preferably, the generation of the axial grooves 12 is realized after the generation of the groove 6. The generation of the axial grooves 12 can be realized by a machining and/or by energy irradiation and/or by plastic deformation. Preferably, the generation of the axial grooves 12 is realized by a plastic deformation of the groove web 7.

Below, a roughening tool 19 for generating the axial grooves 12 by plastic deformation of the cylinder bore wall 5, as well as a corresponding method for roughening the cylinder bore wall 5, is described. The roughening tool 19 has a substantially cylindrical tool main body 20, which at a machine-side end is configured in a conventional manner for clamping into a tool spindle of a machine tool. The tool main body 20 has a main body central longitudinal axis 21, along which an actuating rod 22 is mounted in an axially displaceable manner within the tool main body 20. At a workpiece-side end, on the tool main body 20, on the periphery, a plurality of deformation rollers 23 are mounted rotatably about a respectively associated rotational axis 24. The roughening tool 19 has, for instance, four deformation rollers 23. The rotational axes 24 run perpendicular to the main body central longitudinal axis 21. The deformation rollers 23 are displaceable by means of the actuating rod 22 radially to the main body central longitudinal axis 21. To this end, the actuating rod 22 is, for instance, conically configured, so that a linear movement of the actuating rod 22 along the main body central longitudinal axis 21 results in a radial movement of the deformation rollers 23. An alternative embodiment of the roughening tool 19 has, instead of the actuating rod 22, deformation rollers 23 spring-mounted on the tool main body 20, so that these are displaceable radially to the main body central axis 21. By a radial displacement of the deformation rollers 23, a contact pressure of the deformation rollers 23 against the cylinder bore wall 5 is settable.

Figure 8:
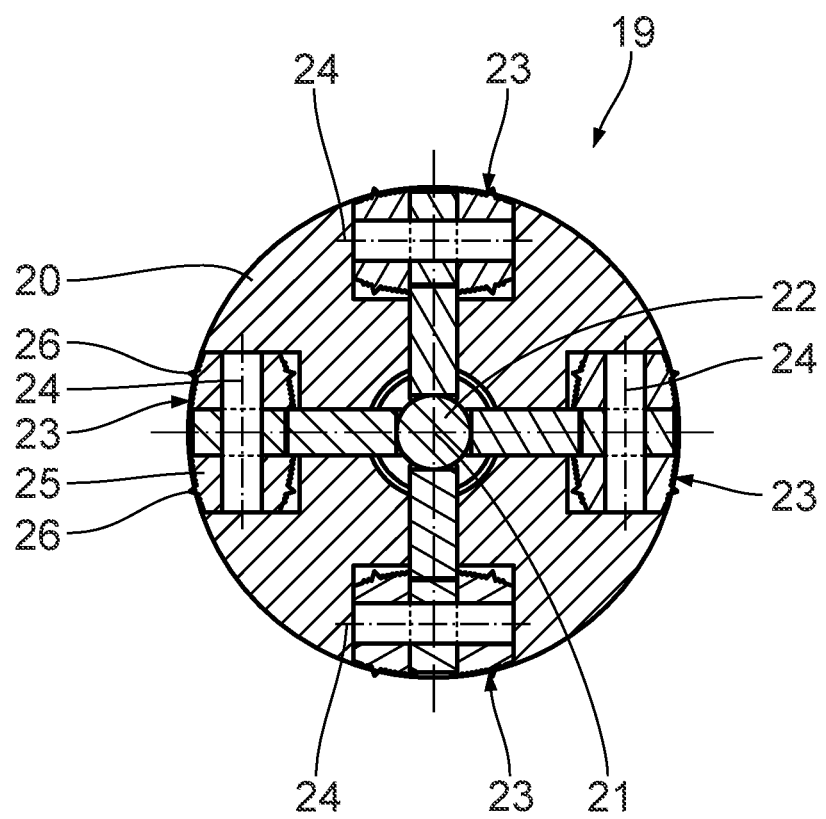
FIG. 8 is a sectional view through the tool along the sectional line VIII-VIII in FIG. 7.

The respective deformation roller 23 has a roller main body 25, on which is configured at least one deformation projection 26, running around the rotational axis 24. In FIG. 8, a plurality of deformation projections 26 are represented by way of example. The deformation projections 26 serve for the plastic deformation of the cylinder bore wall 5 or of the groove web 7. Accordingly, the deformation projections 26 are configured in accordance with the desired cross section of the axial grooves 12.

Below, the generation of the axial grooves 12 by means of the roughening tool 19 is described:

The roughening tool 19 is inserted into the cylinder bore 3. The deformation rollers 23 are radially displaced by means of the actuating rod 22 or a spring device such that they bear with a desired contact pressure against the cylinder bore wall 5. The roughening tool 19 is displaced relative to the component 1 linearly in the direction of the central longitudinal axis 4. In addition, a rotational movement of the roughening tool relative to the component 1 can be superimposed on the linear movement. By the deformation projections 26 of the deformation rollers 23, the cylinder bore wall 5 or the groove web 7 is plastically deformed, so that a first part of the axial grooves 12 is generated. By the contact pressure, the groove depth $T_A$ and groove width $B_A$ of the wedge-shaped axial grooves 12 are set. If the first part of the axial grooves 12 has been generated, then the roughening tool 19 is disengaged from the cylinder bore wall 5. This is realized, for instance, by virtue of the fact that the roughening tool 19 is located outside the cylinder bore 3, or the deformation rollers 23, through displacement of the actuating rod 22, no longer bear in a plastically deforming manner against the cylinder bore wall 5. After this, the roughening tool 19 is pivoted about the main body central longitudinal axis 21, so that the deformation rollers 23 are arranged in a region of the cylinder bore wall 5 in which no axial grooves 12 have yet been generated.

Next, a second part of the axial grooves 12 is generated. To this end, the deformation rollers 23 are displaced radially outward by means of the actuating rod 22 or a spring device, so that these bear with the desired contact pressure against the cylinder bore wall 5. After this, the roughening tool 19 is again displaced linearly along the central longitudinal axis 4, so that the deformation projections 26 plastically deform the cylinder bore wall 5 and generate the second part of the axial grooves 12. The linear movement of the roughening tool 19 can once again be superimposed by a rotational movement. Preferably, the first part of the axial grooves 12 is generated by displacement in a first direction, whereas the second part of the axial grooves 12 is generated by a displacement in an opposite, second direction. Through the plastic deformation of the groove web 7, the material of the main body 2 is displaced into the groove 6, so that the material projections 17 are obtained. By the roughening tool 19, the axial grooves 12 and the material projections 17 can thus be generated in a simple manner.

For the coating S which is subsequently to be applied, which coating is indicated, by way of example, in FIGS. 1, 4 and 5, the groove 6 and the associated groove web 7, as well as the axial grooves 12, form undercuts 11, 15, 16 and 18, so that the coating S has good adhesion in the radial direction R, in the axial direction A and, in particular, also in the peripheral direction Φ. By the axial grooves 12 and the material projections 17, in particular the adhesion in the peripheral direction Φ is markedly improved, so that thermally induced stress cracks or detachments are effectively avoided. As a result of the thermal coating and/or in motor-powered operation, the component 1 is subject to large temperature fluctuations. The temperature fluctuations are in particular, therefore, pronounced, since the component 1 has a low mass. Moreover, the component 1 is made of a light metal and therefore has, in comparison to the iron-containing coating S, a significantly greater coefficient of thermal expansion. The component 1 according to the invention, as well as the method according to the invention for roughening, thus enables a markedly improved adhesion of the coating S which is to be applied to the cylinder bore wall 5.

While specific embodiments of the invention have been shown and described in detail to illustrate the application of the principles of the invention, it will be understood that the invention may be embodied otherwise without departing from such principles.

The invention claimed is:

1. A method for roughening a cylinder bore wall to be coated, the method comprising the following steps:
providing a component having a cylinder bore and a cylinder bore wall extending around a central longitudinal axis;
producing at least one groove, extending around the central longitudinal axis in the cylinder bore wall, and at least one associated groove web, such that the at least one associated groove web, in a radial direction, directed toward the central longitudinal axis, forms first undercuts for a coating which is to be applied;
producing axial grooves, extending transversely to the at least one groove in the cylinder bore wall, such that the at least one associated groove web forms respective second undercuts for the coating which is to be applied in a peripheral direction about the central longitudinal axis, and the at least one associated groove web beside at least one of the axial grooves forms at least one material projection, the at least one material projection extending into the at least one groove and, the at least one material projection forming a respective further undercut in the peripheral direction for the coating which is to be applied;
moving a tool for producing the axial grooves, having at least one deformation roller, along the central longitudinal axis; and
rotating the at least one deformation roller about a rotational axis, extending transversely to the central longitudinal axis, such that on the cylinder bore wall the at least one deformation roller plastically deforms the cylinder bore wall for producing the axial grooves.

2. A method as claimed in claim 1, wherein the at least one groove has a groove depth $T_N$ and the axial grooves have a groove depth $T_A$, wherein: $0.05 \leq T_A/T_N \leq 2$.

3. A method as claimed in claim 1, wherein the at least one associated groove web has a groove web width and the axial grooves extend over a whole of the groove web width.

4. A method as claimed in claim 1, wherein the at least one groove has a groove width $B_N$ and the axial grooves have a groove width $B_A$, wherein: $0.05 \leq B_A/B_N \leq 2$.

5. A method as claimed in claim 1, wherein the axial grooves form with the central longitudinal axis an angle $\alpha$, wherein: $-60° \leq \alpha \leq 60°$.

6. A method as claimed in claim 1, wherein producing the at least one groove comprises a machining.

7. A method as claimed in claim 1, wherein adjacent axial grooves have an angular spacing $\Delta\varphi$ in the peripheral direction, wherein: $0.5° \leq \Delta\varphi \leq 24°$.

8. A method as claimed in claim 1, wherein the axial grooves have a tapered cross section.

9. A method as claimed in claim 8, wherein the tapered cross section has a wedge-shaped configuration.

10. A method as claimed in claim 1, wherein the at least one associated groove web has a plurality of groove web windings extending in the peripheral direction over 360°, and the axial grooves configured in the plurality of groove web windings are oriented along straight lines such that the axial grooves cross the plurality of groove web windings.

11. The method as claimed in claim 1, wherein the at least one deformation roller is rotatably mounted on a tool main body and the at least one deformation roller is radially displaceable relative to the tool main body.

12. A method as claimed in claim 1, wherein producing the axial grooves comprises the following steps:
moving the tool, having the at least one deformation roller, along the central longitudinal axis, such that the at least one deformation roller plastically deforms the cylinder bore for forming a first part of the axial grooves;
pivoting the tool, if the at least one deformation roller is disengaged from the cylinder bore wall; and
moving the tool along the central longitudinal axis such that the at least one deformation roller plastically deforms the cylinder bore for forming a second part of the axial grooves.

13. A method as claimed in claim 12, wherein the at least one deformation roller plastically deforms the at least one associated groove web for forming the first part and of the second part of the axial grooves.

14. A method as claimed in claim 1, wherein the at least one groove has a spiral angle ß, wherein: $0° < ß \leq 4°$.

15. The method as claimed in claim 1, wherein the at least one deformation roller plastically deforms the at least one associated groove web for producing the axial grooves.

16. A method as claimed in claim 1, wherein the at least one deformation roller has a roller main body, on which is configured at least one deformation projection, running around the rotational axis.

* * * * *